United States Patent [19]

Hirsch et al.

[11] 3,993,842

[45] Nov. 23, 1976

[54] ELECTRICALLY CONDUCTIVE ELASTOMERIC INK

[75] Inventors: Albert Edgar Hirsch, Wilmington, Del.; Henry Joseph Stinger, Devon, Pa.

[73] Assignee: E. I. Du Pont de Nemours and Company, Wilmington, Del.

[22] Filed: Mar. 18, 1974

[21] Appl. No.: 451,983

Related U.S. Application Data

[63] Continuation-in-part of Ser. No. 353,967, April 24, 1973, abandoned.

[52] U.S. Cl. ............................. 428/421; 252/509; 252/511; 428/422
[51] Int. Cl.² ..................... C09D 5/24; C09D 11/00; C09D 11/10
[58] Field of Search ................... 252/509, 506, 511; 428/539, 421, 422

[56] References Cited
UNITED STATES PATENTS

| | | | |
|---|---|---|---|
| 3,235,772 | 2/1966 | Gurin | 252/511 |
| 3,281,624 | 10/1966 | Patchen | 252/511 |

FOREIGN PATENTS OR APPLICATIONS 770,829  12/1971  Belgium

*Primary Examiner*—Benjamin R. Padgett
*Assistant Examiner*—Josephine Lloyd

[57] ABSTRACT

An elastomeric ink composition having beneficial utility for the formation of the conductive interlayer in the manufacture of laminated composite polymeric structures to be used as electric heating elements; the ink is a fluoroelastomer solution composition which contains conductive carbon black and which is free of fluoroelastomer crosslinking agents. Some embodiments of the ink preferably also contain a divalent metal oxide or hydroxide.

7 Claims, No Drawings

3,993,842

ELECTRICALLY CONDUCTIVE ELASTOMERIC INK

CROSS REFERENCE TO RELATED APPLICATION

This is a continuation-in-part of U.S. patent application Ser. No. 353,967 filed on Apr. 24, 1973, now abandoned.

BACKGROUND OF THE INVENTION

This invention relates to elastomeric compositions having utility for the formation of electrically conductive elastomer layers on various substrates. The invention relates in particular to fluoroelastomer ink compositions.

Conductive and semiconductive inks have found industrial applications in various fields. For example, such compositions can be used as a coating for aluminum electrical conductors to maintain the conductivity of the aluminum surface which would otherwise be oxidized to a nonconductive aluminum oxide, or as the carbon electrode in thin carbon-zinc batteries. In addition, conductive inks have found recent applicability in composite polymeric electric heating elements of the type incorporating an electrically conductive interlayer between two dielectric films.

Elastomeric materials have frequently formed a major portion of the polymer component of such conductive inks. Fluorocarbon elastomers (fluoroelastomers), particularly those based on copolymers of vinylidene fluoride with other fluorine-containing monomers, have been found especially useful because of their resistance to deterioration by heat and solvents. They have heretofore been used in combination with various crosslinking agents (e.g. certain diamine compounds) to provide cohesiveness and structural integrity of the material in its final processed form.

SUMMARY OF THE INVENTION

The present invention provides an elastomeric ink composition which comprises
  A. 100 parts by weight of a fluoroelastomer, in solution in component B,
  B. an organic solvent for component A, and
  C. about 10–100 parts by weight of electrically conductive carbon black,
said ink being substantially free of crosslinking agents for the fluoroelastomer.

The invention also provides an article which comprises a polymeric film or other suitable substrate coated with a dried layer of the novel ink.

DESCRIPTION OF PREFERRED EMBODIMENTS

Some embodiments of the novel ink preferably also contain about 5–25 parts by weight (per 100 parts of fluoroelastomer) of at least one metal compound selected from the known divalent metal oxides and hydroxides. This is especially true in applications where the ink-coated article will be used at relatively high temperatures and/or for very long periods of time. Metal compounds of this type for use in fluoroelastomer compositions are well known in the art; for example, they are described in column 4 of U.S. Pat. No. 3,686,143 issued to Bowman. An especially preferred metal compound is magnesium oxide.

The composition can also contain one or more other additives known to be useful in conductive elastomer compositions; however, the composition must be completely or almost completely free (substantially free) of fluoroelastomer crosslinking agents.

Component A of the present composition is a fluoroelastomer. One skilled in the art will be able to select from the known fluoroelastomers one that has the molecular weight, heat resistance, compatibility with additives and other properties desired in a particular application. A preferred type of fluoroelastomer is an elastomeric copolymer of vinylidene fluoride and at least one other fluorine-containing monomer. The "other fluorine-containing monomer" is usually an ethylenically unsaturated monomer containing at least one fluorine atom substituent on each double-bonded carbon atom. The copolymer is preferably composed of at least one of the following: copolymers of vinylidene fluoride and hexafluoropropylene or pentafluoropropylene; copolymers of vinylidene fluoride, tetrafluoroethylene and hexafluoropropylene or pentafluoropropylene; and copolymers of vinylidene fluoride, a perfluoroalkyl perfluorovinyl ether and tetrafluoroethylene. Especially preferred are vinyliidene fluoride/hexafluoropropylene copolymers in which the monomers are combined in a molar ratio of about 85:15 to 50:50. Also very useful is a copolymer of about 30–80 moles of vinylidene fluoride, 15–40 moles of hexafluoropropylene, and 5–30 moles of tetrafluoroethylene.

Copolymers of vinylidene fluoride and hexafluoropropylene are described in U.S. Pat. No. 3,051,677 issued to Rexford. Copolymers of vinylidene fluoride, tetrafluoroethylene and hexafluoropropylene are described in U.S. Pat. No. 2,968,649 issued to Pailthorp and Schroeder. Copolymers of vinylidene fluoride and pentafluoropropylene are described in U.S. Pat. No. 3,331,823 issued to Sianesi et al.; and copolymers of these two components with tetrafluoroethylene are described in U.S. Pat. No. 3,335,106 issued to Sianesi et al. Copolymers of vinylidene fluoride, a perfluoroalkyl perfluorovinyl ether (having 1–5 carbon atoms in the alkyl group) and tetrafluoroethylene are described in U.S. Pat. No. 3,235,537 issued to Albin and Gallagher.

Component B of the present case is an organic solvent for the fluoroelastomer. Enough of the solvent is added so that the ink has the viscosity and workability required for the intended application. It is often preferred that the solvent be present in an amount such that the ink has a total solids content of about 10–50% by weight. A solvent is selected from any of the known organic solvents for fluoroelastomers which will provide the ink with the desired properties related to the solvent such as drying rate and viscosity. For example, the ink can contain one or more of the following: ketones such as acetone, methylethyl ketone and methylisobutylketone; esters such as ethyl acetate, butyl acetate, and methyl propionate; and ethers such as ethyleneglycol dimethylether.

Component C is the electrically conductive carbon black, which is present in an amount equal to about 10–100 parts by weight (prefeably about 35–100 parts) per 100 parts of the fluoroelastomer. Acetylene black is used in many of the best embodiments of the invention. However, results which are useful for some applications can also be obtained with other types of carbon black having high electrical conductivity, for example high structure furnace black.

The present ink is substantially free of crosslinking agents for the component A fluoroelastomer; it is preferably completely free of crosslinking agent. In some cases however a trace of crosslinking agent (less than 0.1%, preferably less than 0.05%, based on the weight of fluoroelastomer present) can be present without causing any undue reduction in the ink's shelf life. A prior art fluoroelastomer ink contains a diamine type of crosslinking agent such as N,N'-dicinnamylidene-1, 6-hexane diamine. The present ink is substantially free of this crosslinking agent and other diamine crosslinking agents for fluoroelastomers. It is also substantially free of other known fluoroelastomer crosslinking agents including diamine carbamate crosslinking agents and hydroxylic aromatic crosslinking agents. Thus, at the heart of the present invention is the unexpected discovery that the cross-linking agents previously used and previously thought to be necessary in completed fluoroelastomer compositions in general, and particularly in fluoroelastomer solution compositions employed in the manufacture of fluoroelastomer coatings, films and the like, are unnecessary and even undesirable in the present composition.

The ink can be prepared by using any suitable rubber blending apparatus. The sequence and length of blending can be adjusted to the particular components and solids content required. However, it has been found particularly convenient to dissolve the fluoroelastomer in the solvent, and then add the conductive carbon black and any other solids additives to be used, such as the metal compound mentioned above.

Ink compositions are obtainable according to the present invention which have beneficial utility for the formation of the conductive fluoroelastomer interlayer in laminated composite polymeric structures to be used as electric heating elements. Such utility is illustrated below in the examples. The ink is also very useful for the manufacture of other products having a dried coat of conductive fluoroelastomer in adherent contact with a substrate.

The novel ink can be applied by known coating methods to various substrates including for example metals, polymeric sheets, and glass fiber sheet materials and dried to form conductive fluoroelastomer films, coatings, adhesive layers, composite sheet materials and the like wherein the dried ink layer has surprisingly good strength, ink-to-substrate adhesion, and structural integrity (e.g. as indicated by the abrasion resistance of the ink layer). Another particularly desirable feature of the present ink is its long shelf life, which is often more than twelve months. As shown at the end of Example 1 below, a typical prior art conductive fluoroelastomer ink has a relatively short shelf life.

The following examples illustrate the invention: all amounts are by weight unless otherwise indicated.

EXAMPLE 1

This example illustrates the preparation of an ink of the present invention (Steps 1–3) and its utility in the manufacture of the laminated composite polymeric structure which is very useful as an electric heating element. The laminated structure is prepared by the steps of 1. providing a fluoroelastomer which is a copolymer containing in each 100 parts of copolymerized units 60 parts of vinylidene fluoriide and 40 parts of hexafluoropropylene and whose Mooney viscosity is 35 (ML-10 at 100° C.);

2. making a conductive fluoroelastomer ink composition by thoroughly mixing the following in a ball mill: 100 parts of the fluoroelastomer provided in step (1), 35 parts of acetylene black, 15 parts of magnesium oxide, 350 parts of methylethylketone and 350 parts of butylacetate; this is done by ball-milling particles of the fluoroelastomer with the solvents to form a fluoroelastomer solution, adding the other two ingredients and ball-milling until the composition is substantially free of coarse particles;

3. diluting the ink composition obtained in step (2) until it has a viscosity suitable for application by a Gravure printing apparatus; this is done by adding methylethylketone with stirring until the composition has a Brookfield viscosity of 475 centipoises using a No. 2 spindle at 50 rmp;

4. providing a roll of poly(ethyleneterephthalate) film to be used as the top film of the laminated product, the roll containing 3300 yards of film having a thickness of 0.92 mil and a width of 56 inches;

5. applying the fluoroelastomer ink composition obtained in step (3) to one side of the film provided in step (4) to form a discontinuous conductive elastomer layer; this is done by passing the film at a speed of 30 feet per minute through a Gravure print-coating apparatus so as to apply a printed layer of the fluoroelastomer composition having a thickness when dried of 0.25 mil and having a printed pattern such that the fluoroelastomer layer is divided into 13 inch by 54 inch coated areas by uncoated 3 inch by 54 inch spacing areas and a one inch wide uncoated strip along each edge of the film; then the coated film is passed through a forced-air tunnel whose air temperature is about 110° C. to dry the conductive elastomer layer, and the coated film is wound up on a storage spool;

6. providing a roll of poly(ethyleneterephthalate) film to be used as the bottom film of the laminated product, this roll also containing 3300 yards of 0.92 mil thick 56 inch wide film;

7. making a polyester adhesive composition by mixing 20 parts of a linear copolyester resin with 80 parts of a solvent for the resin composed of 50% toluene and 50% dioxane, said resin having been prepared in the manner described in U.S. Pat. No. 2,892,747, Example 1, by melt polymerizing a mixture of bis(ethylene glycol) esters of four acids in which the terephthalic acid content is 40 mol percent, the isophthalic acid content is 40 mol percent, the adipic acid content is 10 mol percent and the sebacic acid content is 10 mol percent;

8. applying a coat of the polyester adhesive obtained in step (7) to the entire surface of one side of the film provided in step (6); this is done by passing the film at a speed of 30 feet per minute through a Gravure coating apparatus to apply a continuous adhesive layer having a thickness when dried of 0.05 mil, drying the adhesive coated film in a drying tunnel at 110° C. and winding it on a storage spool;

9. preparing a quantity of adhesive-coated aluminum conductor wires; this is done by passing one-mil thick aluminum film from a 3300 yard storage roll through a Gravure coating apparatus to apply a continuous 0.05 mil thick (when dried) coat of the adhesive to the entire surface of one side of the aluminum film, drying the adhesive coated film in a drying tunnel at 110° C., slitting it into ¾ inch wide strips on a conventional slitting machine, and winding the resulting adhesive-coated wires on a storage spool; the adhesive used is a conductive polyester adhesive made by ball-milling 300 parts of the adhesive obtained in step (7) with 100 parts of tetrahydrofuran and 133 parts of acetylene black until the composition is substantially free of coarse particles;

10. continuously forming the laminated heating element by (a) simultaneously unwinding from the storage rolls the conductive elastomer-coated top film made in step (5), the polyester adhesive-coated bottom film made in step (8) and four of the polyester adhesive-coated conductor wires made in step (9), (b) passing these three components at a speed of 30 feet per minute into the nip between the 8 inch diameter 5 foot long smooth metal rolls of a two-roll press which applies a total pressure of about 7000 pounds, only the top roll being heated (175° C.); the arrangement of the components entering the nip is such that the laminate leaving the nip has the structure described below;

11. passing the laminate from the nip of step (10) over two water-cooled rolls, and winding the laminate on a storage spool.

The resulting laminate has the following structure: The conductive elastomer ink-coated side of the top film is bonded to the polyester adhesive coated side of the bottom film. Both edges of the product are sealed by a bonded edge. In the spacing areas, where there is no conductive elastomer ink layer, the top film is bonded to the bottom film. The four adhesive-coated conductor wires each has its bottom surface bonded to the bottom film by the adhesive coat on the film; and each has its top surface bonded to the conductive elastomer ink layer in the elastomer ink-coated areas and to the top film in the spacing areas by the adhesive coat on the wire's top surface. The wires are parallel and spaced so that there is an equal distance between each wire and the next one. At both sides of the product the outer edge of the coated areas is even with the outer edge of the adjacent wire.

The laminated heater prepared in Example 1 is easy and economical to install in the ceilings or other areas of mobile homes, houses and the like. A typical installation can be carried out by cutting a long section of the strip to the desired length along the spacing area at each end of the section of strip to be used, and stapling the strip of laminated material to the ceiling support members which are in contact with the spacing areas adjacent to each of the ink-coated areas. The laminated heater also has high durability, heating efficiency and flexibility, desirably low thickness, and it is practical to mannufacture rapidly by continuous methods. It is especially useful as a ceiling heater to be installed during the construction of mobile homes. It has a specific resistivity of 0.78 ohm-cm. at 21° C. Its heat production is 20 watts per square foot of coated area when one applies between adjacent electrodes 230 volts D.C. or 230 volts A.C. When used as a typical "behind-the-ceiling" installation where the laminated heater is fastened between the ceiling support members and any one of several typical ceiling materials, the heater operates at temperatures up to about 49°–71° C. depending on the thermal conductivity of the ceiling material.

Although the dried fluoroelastomer ink layer contains no crosslinking agent, and thus the fluoroelastomer is not crosslinked or cured, it has very good tensile strength, structural integrity, electrical properties and ink-to-substrate adhesion.

The conductive ink composition obtained in step 3 is a useful article of commerce which can be stored for extended periods of time before being used in a printing or coating operation. For example, the ink obtained in step (3) can be stored for 12 months or more at ordinary storage temperatures within the range of about 60°–80° F. (16°–27° C.) and still be useful for carrying out the laminate-manufacturing process described in Example 1.

When a typical prior art conductive fluoroelastomer ink is prepared by repeating steps (1–3) of Example 1 except in step (2) there is also added a fluoroelastomer crosslinking agent (3 parts of N,N'-dicinnamylidene-1, 6-hexane diamine), it is found that the resulting ink cannot be stored at room temperature for more than three or four weeks without becoming too viscous to use in a laminate-manufacturing process of the type described in Example 1. Thus, the prior art ink would have much less utility than the Example 1 ink as an article of commerce which is to be shipped to various plants and stored until it is used in a coating operation.

EXAMPLE 2

A conductive fluoroelastomer ink is prepared and used in the manufacture of a laminated electric heating element by repeating Example 1 except steps (1–3) are replaced with the following procedure:

A quantity of 630 grams of a copolymer of 78 mole % vinylidene fluoride and 22 mole % hexafluoropropylene is cut into ½ inch to ¾ inch cubes. The fluoroelastomer is placed into a 3 gallon pebble mill jar together with 1500 cc. of acetone and 1500 cc. of butyl acetate and rolled for about 16 hours until the fluoroelastomer is dissolved. After mixing the fluoroelastomer and the solvent, an additional 1500 cc. of each of acetone and butyl acetate are added together with 315 grams of acetylene black and 95 grams of magnesium oxide. This composition is rolled for 24 hours in the pebble mill half filled with flint pebbles.

The results are very similar to those obtained in Example 1.

EXAMPLE 3

A conductive fluoroelastomer ink is prepared and used in the manufacture of a laminated electric heating element by the procedure described in Example 1 except in step (2) the magnesium oxide is omitted and the amount of acetylene black added is 40 parts. The dried conductive ink film formed from this ink has superior retention of high electrical conductivity when the laminated heater is immersed for 5 days in water.

We claim:

1. An elastomeric ink composition having good storage stability which comprises
    A. 100 parts by weight of a fluoroelastomer, in solution in component (B), said fluoroelastomer being selected from the group: copolymers of about 50–85 mole percent of vinylidene fluoride and about 15–50 mole percent of hexafluoropropylene, and copolymers of about 30–80 mole percent of vinylidene fluoride, about 15–40 mole percent of hexafluoropropylene and about 5–30 mole percent of tetrafluoroethylene,
    B. an organic solvent for component (A), and
    C. about 10–100 parts by weight of electrically conductive carbon black,
said ink being substantially free of crosslinking agents for the fluoroelastomer.

2. An ink according to claim 1 which also contains about 5–25 parts by weight of a metal compound selected from the group: divalent metal oxides and hydroxides.

3. An ink according to claim 2 wherein component C consists of about 35–100 parts by weight of acetylene black.

4. An ink according to claim 2 wherein said metal compound is magnesium oxide, and said ink is substantially free of N,N'-dicinnamylidene-1, 6-hexane diamine.

5. An ink according to claim 2 containing said component B solvent in an amount such that the ink has a total solids content of about 10–50% by weight.

6. An article comprising a substrate coated with a dried layer of the ink defined in claim 1.

7. A process for preparing a conductive fluoroelastomer coated article which comprises
applying to a suitable substrate material a layer of the ink defined in claim 1 and
subjecting the resulting coated material to drying conditions until the ink layer is substantially free of solvent.

* * * * *